(12) United States Patent
Kudo et al.

(10) Patent No.: US 12,125,614 B2
(45) Date of Patent: Oct. 22, 2024

(54) WIRING MEMBER

(71) Applicant: Sumitomo Wiring Systems, Ltd., Mie (JP)

(72) Inventors: Ryusuke Kudo, Mie (JP); Masaki Mizushita, Mie (JP); Kenta Arai, Mie (JP); Haruka Nakano, Mie (JP); Tetsuya Nishimura, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 194 days.

(21) Appl. No.: 17/637,689

(22) PCT Filed: Sep. 11, 2020

(86) PCT No.: PCT/JP2020/034475
§ 371 (c)(1),
(2) Date: Feb. 23, 2022

(87) PCT Pub. No.: WO2021/049620
PCT Pub. Date: Mar. 18, 2021

(65) Prior Publication Data
US 2022/0293299 A1   Sep. 15, 2022

(30) Foreign Application Priority Data
Sep. 13, 2019   (JP) ................ 2019-166905

(51) Int. Cl.
*H01B 7/40* (2006.01)
*B60R 16/02* (2006.01)
(Continued)

(52) U.S. Cl.
CPC ........... *H01B 7/40* (2013.01); *B60R 16/0215* (2013.01); *H01B 7/04* (2013.01); *H01B 7/08* (2013.01); *H02G 3/0406* (2013.01)

(58) Field of Classification Search
CPC .......... H01B 7/08; H01B 7/0838; H01B 7/04; H01B 7/40; H01B 13/01263;
(Continued)

(56) References Cited

U.S. PATENT DOCUMENTS 9,299,479 B2 * 3/2016 Gotou ............... H01B 7/0045
2004/0206540 A1 * 10/2004 Frederick ........... B60R 16/0215
174/71 R
(Continued)

FOREIGN PATENT DOCUMENTS

CN   104009424   8/2014
CN   104737398   6/2015
(Continued)

OTHER PUBLICATIONS

Original and Machine Translation of Kito (JP 2003143731A) provided with Office Action (Year: 2003).*
(Continued)

*Primary Examiner* — Roshn K Varghese
(74) *Attorney, Agent, or Firm* — GREENBLUM & BERNSTEIN, P.L.C.

(57) ABSTRACT

A wiring member includes: a base member; and a plurality of wire-like transmission members fixed to the base member, wherein the plurality of wire-like transmission members are fixed to the base member along a route in which a branch wire part branches from a main wire part, the base member includes a main wire fixing part to which the main wire part is fixed and a branch wire fixing part to which a base end part in the branch wire part is fixed, the branch wire part extends to a further outer side from a tip end portion of the branch wire fixing part, and the branch wire part further includes an end portion protection part covering a part of the branch wire part extending from the tip end portion of the branch wire fixing part.

16 Claims, 9 Drawing Sheets

(51) Int. Cl.
*H01B 7/04* (2006.01)
*H01B 7/08* (2006.01)
*H02G 3/04* (2006.01)

(58) Field of Classification Search
CPC ...... H01B 13/01254; H01B 7/17–1895; B60R 16/0215; H02G 3/0406; H02G 3/30; H02G 15/18
See application file for complete search history.

(56) References Cited

U.S. PATENT DOCUMENTS

| | | | |
|---|---|---|---|
| 2010/0230157 A1* | 9/2010 | Sakata | B60R 16/0215 |
| | | | 174/72 A |
| 2014/0144698 A1 | 5/2014 | Sato et al. | |
| 2015/0294768 A1 | 10/2015 | Sakaki et al. | |
| 2015/0329069 A1* | 11/2015 | Daugherty | B60R 16/0207 |
| | | | 174/72 A |
| 2019/0013655 A1 | 1/2019 | Osada et al. | |
| 2020/0062198 A1 | 2/2020 | Mizushita et al. | |

FOREIGN PATENT DOCUMENTS

| | | | | |
|---|---|---|---|---|
| CN | 109217194 | | 1/2019 | |
| JP | 62-285316 | | 12/1987 | |
| JP | 2003143731 A | * | 5/2003 | |
| JP | 2005-80443 | | 3/2005 | |
| JP | 2010-93959 | | 4/2010 | |
| JP | 2013-094012 | | 5/2013 | |
| JP | 2014002982 A | * | 1/2014 | .......... H02G 3/0481 |
| JP | 2014165928 A | * | 9/2014 | ....... H01B 13/01263 |
| JP | 2018-196174 | | 12/2018 | |
| WO | 2013/061624 | | 5/2013 | |

OTHER PUBLICATIONS

Original and Machine Translation of Isamu (JP 2014002982A) provided with Office Action (Year: 2014).*
Original and Machine Translation of Takaaki (JP 2014165928A) provided with Office Action (Year: 2014).*
Translation of JP-2014165928-A provided with Office Action (Year: 2014).*
Japan Office Action issued in Japan Patent Application No. 2019-166905, dated Dec. 27, 2022, along with an English translation thereof.
International Search Report issued in International Patent Application No. PCT/JP2020/034475, dated Nov. 24, 2020, along with an English translation thereof.
International Preliminary Report on Patentability issued in International Patent Application No. PCT/JP2020/034475, dated Mar. 24, 2022, along with an English translation thereof.
China Office Action issued in CN Application No. 202080062474.2, dated Dec. 1, 2023.

* cited by examiner

WIRING MEMBER

TECHNICAL FIELD

The present disclosure relates to a wiring member.

BACKGROUND ART

Patent Document 1 discloses a wire harness including a plurality of electrical wires and a sheet material to which the plurality of electrical wires are fixed. The plurality of electrical wires include a main wire part and a branch wire part branching front the main wire part. The sheet material includes a first part to which the main wire part is fixed and a second part to which the branch wire part is fixed. The second part extends to a position close to a terminal portion of the branch wire part.

PRIOR ART DOCUMENTS

Patent Documents

Patent Document 1: Japanese Patent Application Laid-Open No. 2018-196174

SUMMARY

Problem to be Solved by the Invention

According to a technique disclosed in Patent Document 1, a direction in which a base end portion of the branch wire part extends from the main wire pan is regulated by the second part as pan of the sheet material. However, the second part extends to the position close to the terminal portion of the branch wire part. Thus, desired is further improvement of operability in the terminal portion of the electrical wire.

Accordingly, an object of the present disclosure is to improve operability regarding a terminal portion of a branch wire pan while regulating a direction in which a base end portion of the branch wire part extends from a main wire part.

Means to Solve the Problem

A wiring member according to the present disclosure is a wiring member including: a base member; and a plurality of wire-like transmission members fixed to the base member, wherein the plurality of wire-like transmission members are fixed to the base member along a route in which a branch wire part branches from a main wire part, the base member includes a main wire fixing part to which the main wire part is fixed and a branch wire fixing part to which a base end part in the branch wire part is fixed, and the branch wire part extends to a further outer side from a tip end portion of the branch wire fixing part, and the wiring member further includes an end portion protection part covering a part of the branch wire part extending from the tip end portion of the branch wire fixing part.

Effects of the Invention

According to the present disclosure, operability regarding the terminal portion of the branch wire part is improved while an extension direction of the base end portion of the branch wire part is regulated in the wiring member.

DESCRIPTION OF EMBODIMENT(S)

Description of Embodiment of Present Disclosure

Embodiments of the present disclosure are listed and described firstly.

A wiring member according to the present disclosure is as follows.

(1) A wiring member includes: a base member; and a plurality of wire-like transmission members fixed to the base member, wherein the plurality of wire-like transmission members are fixed to the base member along a route in which a branch wire part branches from a main wire part, the base member includes a main wire fixing part to which the main wire part is fixed and a branch wire fixing part to which a base end part in the branch wire part is fixed, and the branch wire part extends to a further outer side from a tip end portion of the branch wire fixing pan, and the wiring member further includes an end portion protection part covering a part of the branch wire part extending from the tip end portion of the branch wire fixing part.

According to this wiring member, a direction in which a base end portion of the branch wire part extends from the main wire part is regulated by the branch wire fixing part. The plurality of wire-like transmission members are fixed to the base member, however, the terminal portion of the branch wire part is not tied by the base member and the end portion protection part, for example, before the end portion protection part covers the branch wire part. Thus, operability of the terminal portion of the branch wire part is improved.

(2) The base member may include a sheet member. In this case, the base member is easily formed into a flat shape.

(3) The end portion protection part may made up of an adhesive tape wound around a part of the branch wire part extending from a tip end portion of the branch wire fixing part. In this case, the end portion protection part is easily made up of the adhesive tape. The end portion protection part made up of the adhesive tape can regulate a route of the branch wire part to some extent while allowing the branch wire part to be beaded in multiple directions, thus operability for connecting the branch wire part to the other member is improved.

(4) The end portion protection part may be a corrugate tube externally mounted to a part of the branch wire part extending from a tip end portion of the branch wire fixing part. In this case, the end portion protection part is easily formed by the corrugate tube. The end portion protection part formed by the corrugate tube can regulate a route of the branch wire part to sonic extent while allowing the branch wire part to be bended in multiple directions, thus operability for connecting the branch wire part to the other member is improved.

(5) The wiring member may include a winding fixing part made up of an adhesive tape wound around a base end part of the branch wire part and the branch wire fixing part. In this case, the base end portion of the branch wire part is more reliably fixed to the branch wire fixing part by the winding fixing part.

(6) It is also applicable that the wiring member includes a winding fixing part made up of an adhesive tape wound around a base end part of the branch wire part and the branch wire fixing part, wherein the adhesive tape constituting the end portion protection part and the adhesive tape constituting the winding fixing part are continuously formed. In this case, the end portion protection part and the winding fixing part are continuously formed by the continuous adhesive tapes easily.

(7) A length of the branch wire fixing part may be equal to or larger than a width of the adhesive tape constituting the winding fixing part. In this case, the base end portion of the branch wire part is firmly fixed to the branch wire fixing part.

(8) It is also applicable that the branch wire fixing part includes a bending part, and a base end portion of the branch wire part is fixed to the branch wire fixing part in a state of being bonded in the bending part. In this case, the branch wire part is easily disposed along a curved route.

(9) It is applicable that the base member includes a base sheet member to which the main wire part is fixed and a cover sheet member covering the main wire part on the main wire fixing part, and the base end portion of the branch wire part is disposed between the base sheet member and the cover sheet member in the branch wire fixing part.

In this case, the main wire part and the base end portion of the branch wire part are firmly protected by the base sheet member and the cover sheet member.

(10) It is also applicable that the plurality of wire-like transmission members branch into a first end portion branch wire part and a second end portion branch wire part as the branch wire part at an end portion of the main wire part, the base member branches into a first end portion branch wire fixing part and a second end portion branch wire fixing part as the branch wire fixing part at an end portion of the main wire fixing part, a base end part of the first end portion branch wire part is fixed to the first end portion branch wire fixing part, and a base end part of the second end portion branch wire part is fixed to the second end portion branch wire fixing part. In this case, the first end portion branch wire fixing part and the second end portion branch wire fixing part regulate the end portion of the main wire part so that the first end portion branch wire part and the second end portion branch wire part separately extend.

(11) It is also applicable that the plurality of wire-like transmission members branch into a middle branch wire part as the branch wire part in a middle portion in an extension direction of the main wire part, the base member branches into a middle branch wire fixing part as the branch wire fixing part in a middle portion in an extension direction of the main wire fixing part, and a base end part of the middle branch wire part is fixed to the middle branch wire fixing part. In this case, the middle branch wire fixing part may regulate an extension direction of the middle branch wire part in the middle portion in the extension direction of the main wire part.

Details of Embodiment of Present Disclosure

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment

Figure 1:
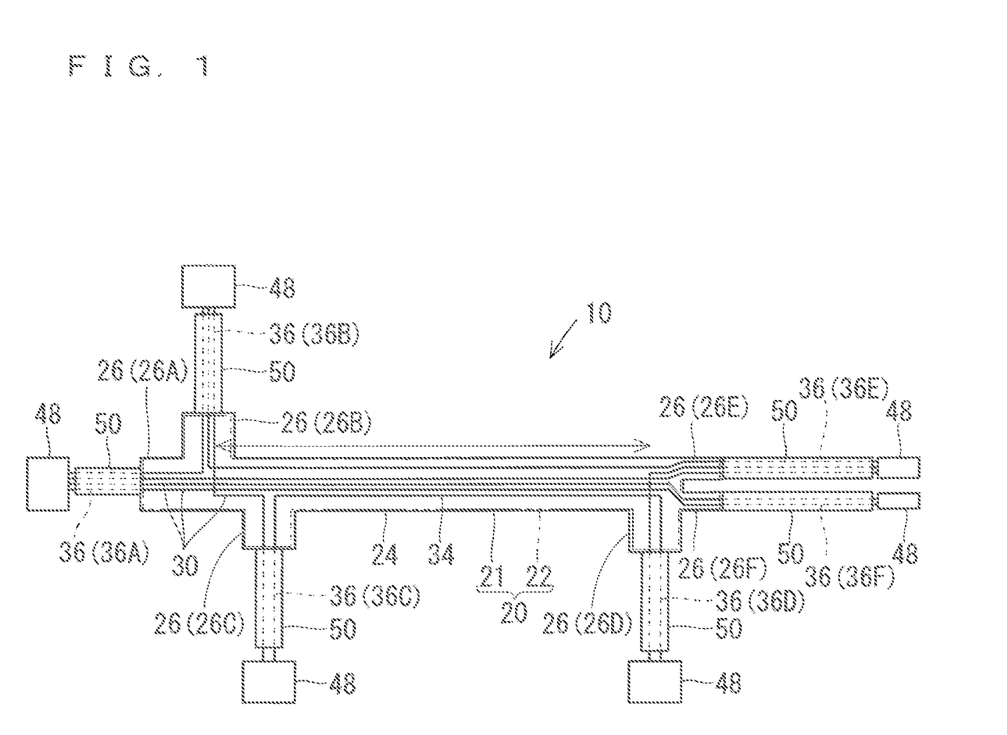
FIG. 1 is a plan view illustrating a wiring member according to an embodiment.

A wiring member according to an embodiment is described hereinafter. FIG. 1 is a plan view illustrating a wiring member 10. The wiring member 10 includes a base member 20 and a plurality of wire-like transmission members 30.

The base member 20 may be formed into a flat shape, in the description herein, the base member 20 is flatly formed. The plurality of wire-like transmission members 30 are fixed to the base member 20, thus the wiring member 10 is kept in a flat state.

The plurality of wire-like transmission members 30 are fixed to the base member 20 along a route in which a branch wire part 36 branches from a main wire part 34. The main wire part 34 is a part where all or some of the plurality of wire-like transmission members 30 are collected so that the number of the wire-like transmission members 30 becomes the largest. The branch wire part 36 is a part where at least one wire-like transmission member 30 branches from the end portion or the middle portion in the extension direction of the main wire part 34. Herein, the plurality of branch wire parts 36 extend from the main wire part 34. The plurality of branch wire parts 36 are distinguished by the following codes as necessary. The main wire part 34 branches into two parts from one end portion (a left end portion, in FIG. 1) to form the branch wire parts extending therefrom, and one of the two parts is a branch wire part 36A (extending to a left side in FIG. 1) and the other one of the two parts is a branch wire part 36B (extending to an upper side in FIG. 1). One branch wire part extends from the middle portion in the extension direction of the main wire part 34 (extending in a lower side in FIG. 1), and this is a branch wire part 36C. The main wire part 34 branches into three parts from the other end portion (a right end portion in FIG. 1) to form the branch wire parts extending therefrom, and one of the three parts is a branch wire part 36D (extending to a lower side in FIG. 1) and the other two of the three parts are branch wire parts 36E and 36F (extending to a right side in FIG. 1). A connector 48 is provided on an end portion of the branch wire part 36. A terminal of an end portion of the wire-like transmission member 30 is assumed to be inserted into the connector 48. This connector 48 is connected to the other side component, thus the wire-like transmission member 30 is connected to the other side component.

The plurality of wire-like transmission members 30 are assumed to be wire-like transmission members connecting components in a vehicle. A branching position where the branch wire part 36 branches from the main wire part 34 and an extension direction of the branch wire part 36 are set in accordance with a position of a component which is a connection destination of the branch wire part 36. The plurality of wire-like transmission members 30 are fixed to the base member 20, thus the plurality of wire-like transmission members 30 are kept in a form following a wiring route corresponding to a position of a component as a connection destination of each wire-like transmission member 30.

More specifically, the wire-like transmission member 30 may be a wire-like member transmitting an electrical power or light, for example. For example, the wire-like transmission member 30 may be a general wire having a core wire and a covering around the core wire, or may also be a bare wire, a shielded wire, a twisted wire, an enamel wire, a nichrome wire, or an optical fiber.

The wire-like transmission member 30 transmitting the electrical power may be various kinds of signal lines or various kinds of power lines. Some of the wire-like transmission members transmitting the electrical power may be used as an antenna or coil, for example, transmitting or receiving a signal or electrical power to or from a space.

The wire-like transmission member 30 may be a single wire-like object or a composite object of a plurality of wire-like objects (a twisted wire and a cable made up of a plurality of wire-like objects covered by a sheath).

Description herein is based on an assumption that the wire-like transmission member 30 is an electrical wire.

More specifically, the base member 20 includes a base sheet member 21 as an example of the sheet member. The base sheet member 21 may be a resin sheet. For example, the base sheet member 21 may be formed of resin such as polyvinyl chloride (PVC), polyethylene (PE), polypropylene (PP), or polyethylene terephthalate (PET). The base sheet member 21 is also considered a non-woven cloth or a foamed sheet, for example. The base sheet member 21 may have a single layer structure, or may also have a multilayer structure. The base sheet member 21 may have a metal layer.

In the present embodiment, the base member 20 further includes a cover sheet member 22. Herein, the base sheet member 21 and the cover sheet member 22 are formed into the same shape, and the cover sheet member 22 is overlapped with the whole base sheet member 21. The cover sheet member 22 covers the wire-like transmission member 30 from a side opposite to the base sheet member 21. In other words, the plurality of wire-like transmission members 30 are provided between the base sheet member 21 and the cover sheet member 22.

The cover sheet member 22 may be a resin sheet. For example, the cover sheet member 22 may be formed by resin such as PVC, PE, PP, or PET in the manner similar to the base sheet member 21. The cover sheet member 22 may have higher rigidity titan the base sheet member 21. For example, it is also applicable that the base sheet member 21 is made up of a non-woven cloth, and the cover sheet member 22 is formed of nylon, PET, or PP, for example, as a sheet with an inner portion evenly filled. In this case, the wiring member 10 is kept in a constant flat form easily compared with a case where there is no the cover sheet member 22.

Both side edge portions of the cover sheet member 22 are fixed to both side edge portions of the base sheet member 21. The cover sheet member 22 and the base sheet, member 21 may be fixed by welding, bonding, adhesion, sewing, for example. The welding may be ultrasonic welding or thermal welding.

The base member 20 includes a main wire fixing part 24 and a branch wire fixing part 26. Herein, the main wire fixing part 24 is formed into a band-like shape extending straight. The main wire fixing part 24 may be bended in a midway portion. The main wire part 34 of the plurality of wire-like transmission members 30 is fixed to the main wire fixing part 24. Herein, a fixing structure of the wire-like transmission member 30 fixed to the main wire fixing part 24 is not particularly limited as long as the wire-like transmission member 30 is kept in a form following the main wire fixing part 24.

The branch wire fixing part 26 extends from an end portion or a middle portion in an extension direction of the main wire fixing part 24. Herein, the plurality of branch wire fixing parts 26 are provided. The plurality of branch wire fixing parts 26 are distinguished by the following codes as necessary. The main wire fixing part 24 branches into two parts from one end portion (a left end portion in FIG. 1) to form the branch wire fixing part extending therefrom, and one of the two parts is a branch wire fixing part 26A (extending to a left side in FIG. 1) and the other one of the two parts is a branch wire fixing part 26B (extending to an upper side in FIG. 1). One branch wire fixing part extends from the middle portion in the extension direction of the main wire fixing part 24 (extending in a lower side in FIG. 1), and this is a branch wire fixing part 26C. The main wire fixing part 24 branches into three parts from the other end portion (a right end portion in FIG. 1) to form the branch wire fixing parts extending therefrom, and one of the three parts is a branch wire fixing part 26D (extending to a lower side in FIG. 1) and the other two of the three parts are branch wire fixing parts 26E and 26F (extending to a right side in FIG. 1). The two branch wire fixing parts 26E and 26F extend in parallel to each other on an extended line of the main wire part 34. A gap may be or may not be located between the two branch wire fixing parts 26E and 26F.

Assumed are a case where the branch wire part 36 and the branch wire fixing part 26 in the present wiring, member 10 are provided in the end portion of the main wire part 34 and a case where they are provided in a midway portion of the main wire part 34.

In the former case, the plurality of wire-like transmission members 30 may also be considered to branch into the first end portion branch wire part 36A and the second end portion branch wire part 36B as the branch wire part 36 in one end portion of the main wire part 34 (refer to a left end portion in FIG. 1). The base member 20 may also be considered to branch into the first end portion branch wire fixing part 26A and the second end portion branch wire fixing part 26B as the branch wire fixing part 26 in one end portion of the main wire fixing part 24 (the left end portion in FIG. 1). It may also be considered that a base end part of the first end portion branch wire part 36A is fixed to the first end portion branch wire fixing part 26A, and a base end part of the second end portion branch wire part 36B is fixed to the second end portion branch wire fixing part 26B.

The plurality of wire-like transmission members 30 may also be considered to branch into the first end portion branch wire part (one of 34D, 34E, and 34F) and the second end portion branch wire part (the other one of 34D, 34E, and 34F) as the branch wire part 36 in the other end portion of the main wire part 34 (refer to the right end portion in FIG. 1). The base member 20 may also be considered to branch into the first end portion branch wire fixing part one of 24D, 24E, and 24F) and the second end portion branch wire fixing part (the other one of 24D, 24E, and 24F) as the branch wire fixing part 26 in the other end portion of the main wire fixing part 24 (the right end portion in FIG. 1). It may also be considered that a base end part of the first end portion branch wire part (one of 34D, 34E, and 34F) is fixed to the first end portion branch wire fixing part (one of 24D, 24E, and 24F), and a base end part of the second end portion branch wire part (the other one of 34D, 34E, and 34F) is fixed to the second end portion branch wire fixing part (the other one of 34D, 34E, and 34F).

In the latter case, the plurality of wire-like transmission members 30 may also be considered to branch into the middle branch wire part 36C as the branch wire part 36 in the middle portion in the extension direction of the main wire part 34. The base member 20 may also be considered to branch into the middle branch wire fixing part 26C as the branch wire fixing part 26 in the middle portion in the extension direction of the main wire fixing part 24. The base end part of the middle branch wire part 36C may also be considered to be fixed to the middle branch wire fixing part 26C.

Each of the plurality of branch wire fixing parts 26 is formed into a quadrangular or an elongated band-like shape. The branch wire fixing part 26 May be bended in a midway portion. The base end part of the branch wire part 36 of the plurality of wire-like transmission members 30 is fixed to the branch wire fixing part 26. Herein, a fixing structure of the wire-like transmission member 30 fixed to the branch wire fixing part 26 is not particularly limited as long as the wire-like transmission member 30 is kept in a form following the branch wire fixing part 26.

The wire-like transmission member 30 is fixed to the base sheet member 21 in the main wire fixing part 24 and the branch wire fixing part 26. Applicable as the fixing state are a contact area fixation and a non-contact area fixation, or both fixations may be used together. Herein, the contact area fixation indicates that a portion where the wire-like transmission member 30 and the base sheet member 21 have contact with each other is stuck and fixed. The non-contact area fixation indicates the fixing state which is not the contact area fixation. For example, a sewing thread, the other sheet material (for example, the cover sheet member 22), or an adhesive tape presses the wire-like transmission member 30 toward the base sheet member 21, or a sewing thread, the other sheet material, or an adhesive tape sandwiches the wire-like transmission member 30 and the base sheet member 21, thereby keeping the state. In the description hereinafter, the wire-like transmission member 30 and the base sheet member 21 are in the state of the contact area fixation.

Applicable as the configuration of the contact area fixation are a contact area indirect fixation and a contact area direct fixation, or both fixations may also be used together in different regions. Herein, the contact area indirect fixation indicates that the wire-like transmission member 30 and the base sheet member 21 are indirectly stack and fixed via an adhesive agent, a gluing agent, and a double-sided adhesive tape provided therebetween. The contact area direct fixation indicates that the wire-like transmission member 30 and the base sheet member 21 are directly stuck and fixed without an intervention of the adhesive agent, for example, which is separately provided. Considered in the contact area direct fixation is that resin included in at least one of the wire-like transmission member 30 and the base sheet member 21 is melted, thus the wire-like transmission member 30 and the base sheet member 21 are stuck and fixed, for example.

In forming the state of such a contact area direct fixation, the resin is considered to be melted by beat or a solvent, for example. That is to say, the state of the contact area direct fixation may be the suite of the contact area direct fixation by the heat or the state of the contact area direct fixation by the solvent. The contact area direct fixation by the heat is preferable.

At this time, a means of forming the state of the contact area direct fixation is not particularly limited, but a known means such as welding, fusion, and melting joint can be used. For example, when the state of the contact area direct fixation by the heat is formed by welding, various welding means such as ultrasonic welding, heating-pressurizing welding, hot air welding, and high frequency welding can be adopted. When the state of the contact area direct fixation is formed by these means, the wire-like transmission member 30 and the base sheet member 21 are in the state of the contact area direct fixation by these means. Specifically, when the state of the contact area direct fixation is formed by the ultrasonic welding, for example, the wire-like transmission member 30 and the base sheet member 21 are in the state of the contact area direct fixation by the ultrasonic welding.

In the description hereinafter, the wire-like transmission member 30 and the base sheet member 21 are in the state of the contact area direct fixation. The wire-like transmission member 30 needs not be fixed to the base sheet member 21 in the same form in both the main wire fixing part 24 and the branch wire fixing part 26. It is also applicable that the wire-like transmission member 30 is fixed in the form of the contact area direct fixation by welding, for example, in the main wire fixing part 24, and the wire-like transmission member 30 is sandwiched between the base sheet member 21 and the cover sheet member 22 and fixed in the branch wire fixing part 26. The wire-like transmission member 30 may be fixed to the base sheet member 21 by an adhesive tape wound around them in the branch wire fixing part 26.

The branch wire part 36 extends from a tip end portion of the branch wire fixing part 26 toward a further outer side. In other words, the branch wire part 36 is longer than the branch wire fixing part 26. Thus, the base end part of the branch wire part 36 is fixed to the branch wire fixing part 26. Accordingly, the direction in which the base end portion of the branch wire part 36 extends from the main wire part 34 is regulated in a state following the extension direction of the branch wire fixing part 26. Particularly, the branch wire fixing part 26 has a flat shape, thus the route of the base end portion of the branch wire part 36 is firmly regulated in a flat direction.

A part of the branch wire part 36 extending from the tip end portion of the branch wire fixing part 26 to a further outer side is covered by an end portion protection part 50. It is preferable that the end portion protection part 50 is continuously formed on the branch wire fixing part 26 with no gap. Accordingly, the part of the branch wire part 36 on a tip end side of the branch wire fixing part 26 is also kept so that a route thereof is regulated to some extent by the branch wire fixing part 26. A part of the branch wire part 36 located between the branch wire fixing part 26 and the end portion protection part 50 is protected with no gap. All of the part of the branch wire part 36 extending from the tip end portion of the branch wire fixing part 26 to a further outer side needs not be covered by the end portion protection part 50, however, the extension part may be partially exposed from the end portion protection part. For example, a gap where the branch wire part 36 is exposed may be formed between the end portion protection part 50 and the connector 48.

The end portion protection part 50 covers the part of the branch wire part 36 extending from the branch wire fixing part 26 in a whole circumferential direction. Accordingly, the branch wire part 36 is protected. The end portion protection part 50 has a horizontal sectional shape closer to a circular shape than the branch wire fixing part 26 (cross sectional shape perpendicular to the extension direction of the branch wire part 36). Thus, the route of the part of the branch wire part 36 protected by the end portion protection part 50 is regulated within a range so as to be able to be bonded by applying force in a direction perpendicular to the extension direction thereof.

That is to say, the route of the part of the branch wire part 36 fixed by the branch wire fixing part 26 is relatively firmly regulated on a surface including the main wire fixing part 24 and the branch wire fixing part 26. The route of the part of the branch wire part 36 protected by the end portion protection part 50 is regulated within a range so as to be able to be bended to side to side and up and down.

The end portion protection part 50 may have a configuration of being able to be assembled to the branch wire 36 afterward in a state where the plurality of wire-like transmission members 30 are fixed to the base member 20.

More specific example of the end portion protection part 50 is described.

Figure 2:
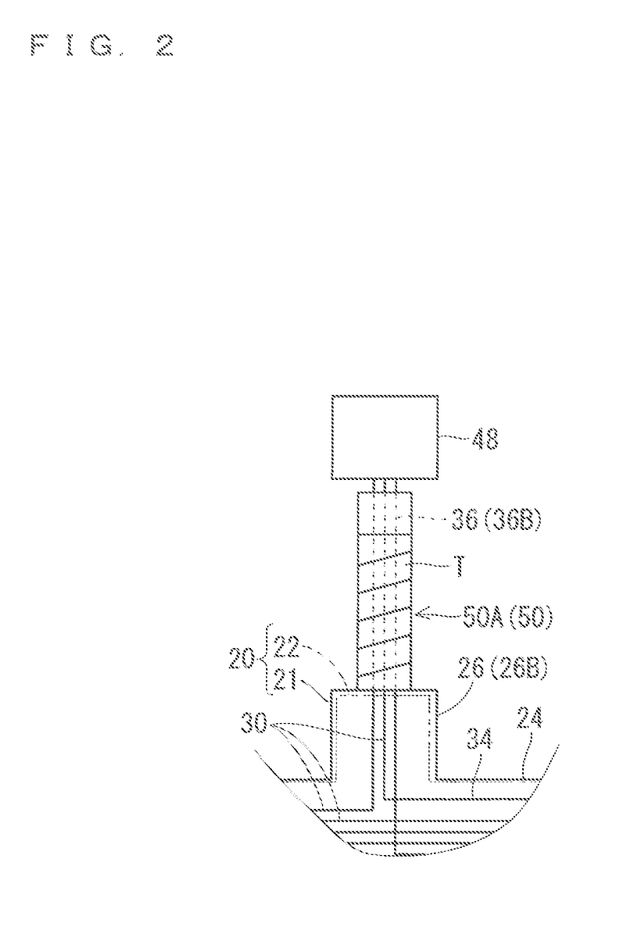
FIG. 2 is a plan view illustrating an end portion protection part according to a first example.

FIG. 2 is a partial plan view illustrating an end portion protection part 50A according to a first example. In this example, the end portion protection part 50A is made up of an adhesive tape T wound around the part of the branch wire part 36 extending from the tip end portion of the branch wire fixing part 26. The adhesive tape T may be spirally wound from the connector 48 toward the branch wire fixing part 26, or may also be spirally wound from the branch wire fixing part 26 toward the connector 48. The adhesive tape T may be wound in a way that a half thereof is overlapped (referred to as a half wrapping), or may also be wound in a tighter or rougher way.

Figure 3:
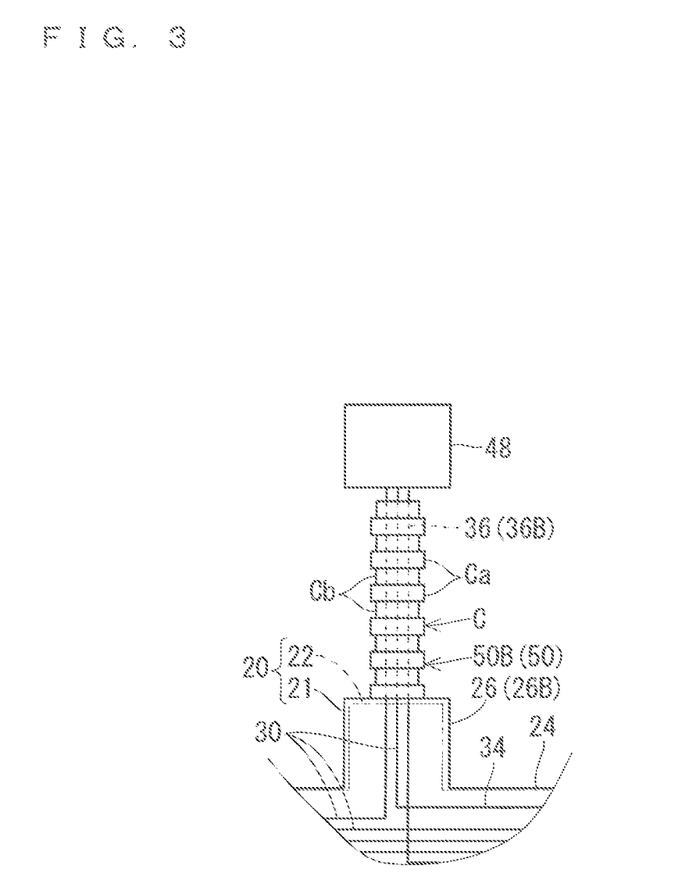
FIG. 3 is a plan view illustrating an end portion protection part according to a second example.

FIG. 3 is a partial plan view illustrating an end portion protection part 50B according to a second example. In this example, the end portion protection part 50B is made up of a corrugate tube C externally mounted to the part of the branch wire part 36 extending from the tip end portion of the branch wire fixing part 26. The corrugate tube C is a tube-like member made up of a large diameter part Ca and a small diameter part Cb thinner than the large diameter part Ca alternately arranged, and is formed of resin, for example. The corrugate tube C allows the branch wire part 36 to be herded to side to side and up and down while protecting the branch wire part 36. When a slit is formed in the corrugate tube C along an extension direction thereof, the branch wire part 36 can be externally mounted to the corrugate tube C easily. An adhesive tape may be partially or wholly wound around the corrugate tube C which is externally mounted. A way of winding of the adhesive tape in this case may be winding with a gap, that is so-called rough winding.

Figure 4:
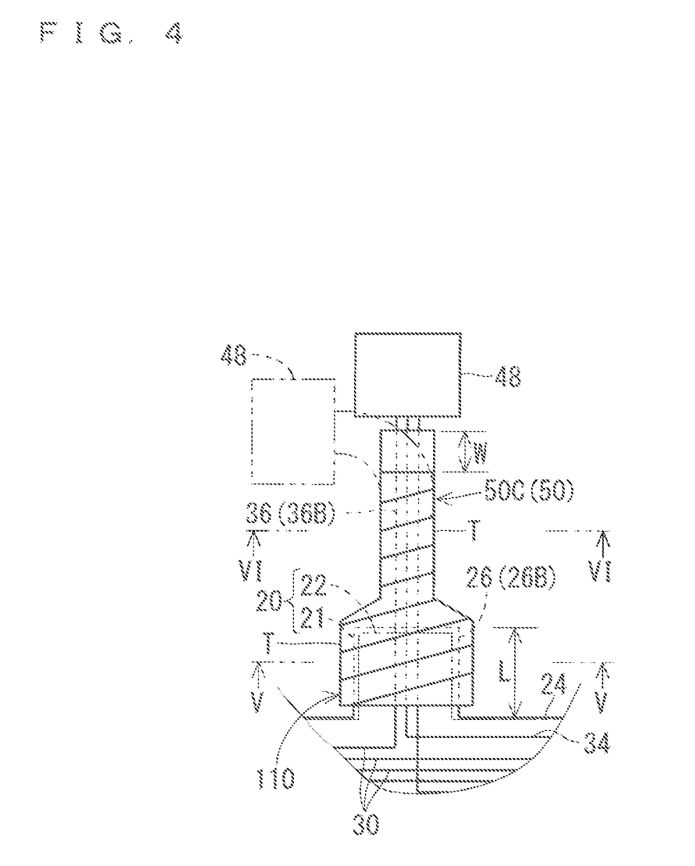
FIG. 4 is a plan view illustrating an end portion protection part and winding fixing part according to a third example.
Figure 5:
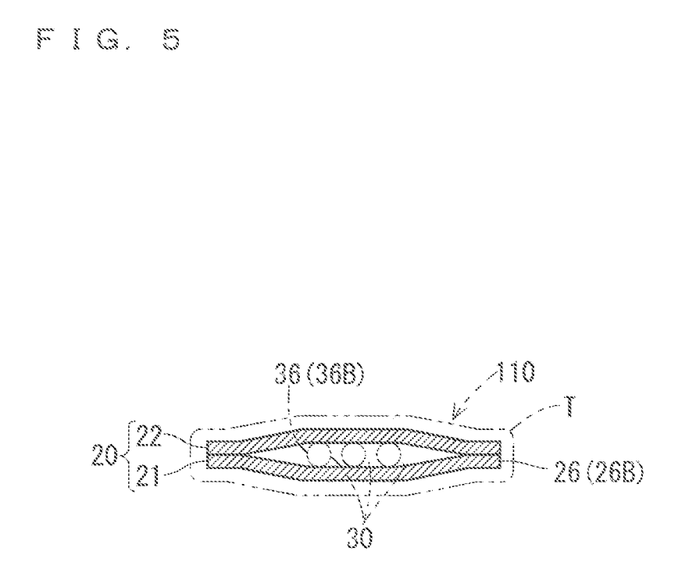
FIG. 5 is a cross-sectional view along a V-V line in FIG. 4.
Figure 6:
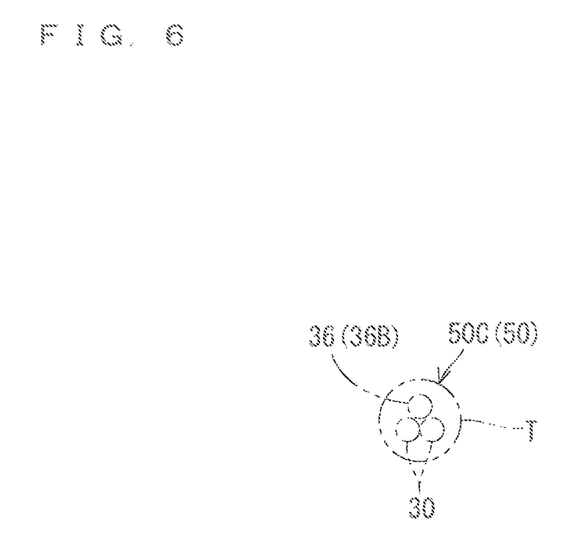
FIG. 6 is a cross-sectional view along a VI-VI line in FIG. 4.

FIG. 4 is a partial plan view illustrating an end portion protection part 50C and a winding fixing part 110 according to a third example. FIG. 5 is a cross-sectional view along a V-V line in FIG. 4. FIG. 6 is a cross-sectional view along a VI-VI line in FIG. 4.

In this example, the end portion protection part 50C is made up of the adhesive tape T wound around the part of the, branch wire part 36 extending from the tip end portion of the branch wire fixing part 26. The branch wire part 36 can be freely bended to some extent in the end portion protection part 50C (refer to dashed-two dotted lines in FIG. 4). In addition, the winding fixing part 110 is made up of the adhesive tape T wound around the base end part of the branch wire part 36 and the branch wire fixing part 26. In the winding fixing part 110, the adhesive tape T is wound around an outer side of the base sheet member 21 and the cover sheet member 22 in the branch wire fixing part 26. Thus, the base end, part of the branch wire part 36 is more firmly fixed to the base sheet member 21 and the cover sheet member 22 in the branch wire fixing part 26. Even in a case where one of the base sheet member 21 and the cover sheet member 22 is omitted in the branch wire fixing part, the base end part of the branch wire part is firmly fixed to the branch wire fixing part by the adhesive tape T.

The adhesive tape T constituting the end portion protection part 50 and the adhesive tape T constituting the winding fixing part 110 are the same adhesive tape T continuously formed. For example, one continuous adhesive tape T is spirally wound from the end portion of the branch wire part 36 toward the branch wire fixing part 26, or is wound reversely to constitute the end portion protection part 50 and the winding fixing part 110. The adhesive tape T constituting the end portion protection part 50 and the adhesive tape T constituting the winding fixing part 110 may be different from each other.

In the case where the adhesive tape T is wound around the winding fixing part 110, a length L of the branch wire fixing part 26 is preferably equal to or larger than a width W of the adhesive tape T constituting the winding fixing part 110. Accordingly, a region in the adhesive tape T as large as possible in the width direction is wound around the branch wire fixing part 24. Thus, the winding fixing part 110 hardly deviates from the branch wire fixing part 26.

According to the wiring member 10 having such a configuration, the base end part of the branch wire part 36 is fixed to the branch wire fixing part 26, thus the direction in which the base end portion of the branch wire part 36 extends from the main wire part 34 is regulated by the branch wire fixing part 26. Thus, the connector 48 on the end portions of the plurality of branch wire parts 36, for example, can be disposed close to a connection destination thereof while the wiring member 10 is disposed in a vehicle which is an arrangement object member. Thus, a connection operation of each connector 48, for example, is easily performed. In a direction of a main surface of the branch wire fixing part 26, the end portion protection part 50 can be bended more easily than the branch wire fixing part 26. Thus, when the connector 48 is connected to the other side connector, the connection operation of the connector 48 can be easily performed while bending the part of the branch wire part 36 where the end portion protection part 50 is externally mounted.

Figure 7:
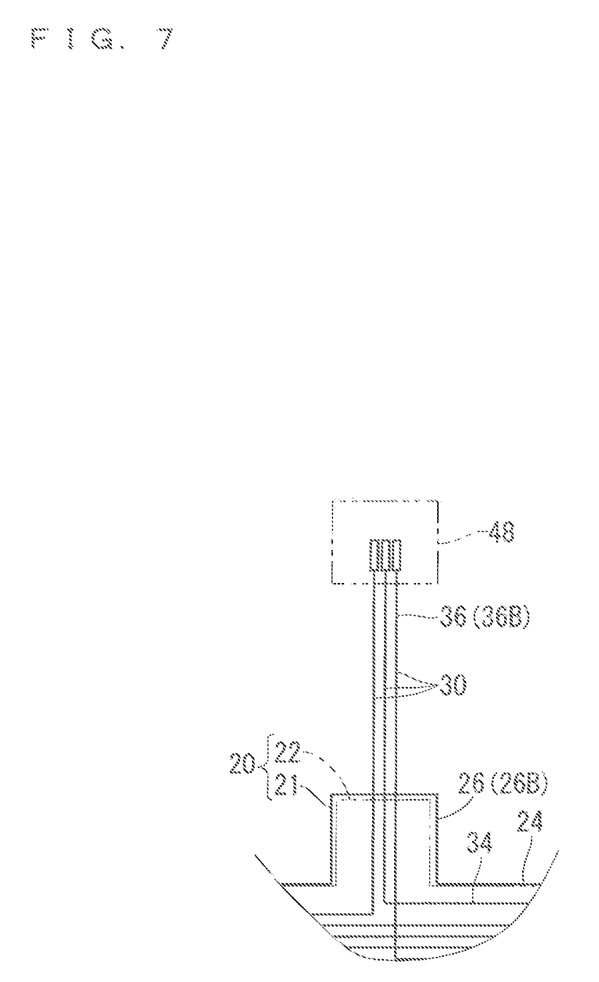
FIG. 7 is a plan view illustrating a branch wire part before being covered by an end portion protection part.

As illustrated in FIG. 7, before the end portion protection part 50 covers the branch wire part 36, a terminal portion of the branch wire part 36 is not tied by the base member 20 and the end portion protection part 50. Thus, operability of the terminal portion of the branch wire part 36 is improved. For example, assumed is an operation of connecting a terminal on the end portion of the wire-like transmission member 30 to the connector 48 in the terminal portion of the branch wire part 36. In this ease, the end portions of the wire-like transmission members 30 are separately located, thus an operation of inserting and connecting the terminal on the end portion thereof to the connector 48 can be easily performed. For example, the terminal on the end portion of the wire-like transmission member 30 can also be automatically inserted by an automatic terminal insertion device, for example, easily. From a viewpoint of operability of insertion to the connector 48, a distance front the end portion of the branch wire fixing part 26 to the connector 48 is preferably equal to or larger than 5 cm, and is more preferably equal to or larger than 10 cm.

The end portion protection parts 50A and 50C made up of the adhesive tape T are easily made by performing the operation of winding the adhesive tape T. The end portion protection parts 50A and 50C made up of the adhesive tape T can regulate the route of the branch wire part 36 to some extent while allowing the branch wire part 36 to be bended in the other direction. Thus, operability of connecting the branch wire part 36 to the other member is improved.

The end portion protection part 50B made up of the corrugate tube C is easily made by performing the operation of covering the branch wire part 36 by the corrugate tube C and fixing the corrugate tube C thereto. The end portion protection part 50B made up of the corrugate tube C can regulate the route of the branch wire part 36 to some extent while allowing the branch wire part 36 to be bended in the other direction. Thus, operability of connecting the branch wire part 36 to the other member is improved.

When the branch wire fixing part 26 and the branch wire part 36 are fixed by the winding fixing part 110 around which the adhesive tape T is wound, the base end portion of the branch wire part 36 is more reliably fixed by the branch wire fixing pail 26.

In this case, when the length of the branch wire fixing part 26 is equal to or larger than the width of the adhesive tape T, the adhesive tape T is firmly wound around the branch wire fixing part 26. Accordingly, the base end portion of the branch wire part 36 is firmly fixed to the branch wire fixing part 26.

When the adhesive tape T constituting the winding fixing part 110 and the adhesive tape T constituting the end portion protection part 50C are the continuous adhesive tape T, the winding fixing part 110 and the end portion protection part 50C are continuously formed easily.

The base member 20 includes the base sheet member 21 and the cover sheet member 22, and the base end portion of the branch wire part 36 is disposed between the base sheet member 21 and the cover sheet member 22 in the branch wire fixing part 26. Accordingly, the main wire part 34 and the base end portion of the branch wire part 36 can be firmly protected by the base sheet member 21 and the cover sheet member 22.

In this case, it is applicable that the adhesive tape T is would from the branch wire fixing part 26 to the end portion protection part 50C as with the example illustrated in FIG. 4 and an opening on a side of the tip end of the end portion protection part 50B is dosed by the adhesive tape T. Accordingly, ingress of a foreign object into a space between the base sheet member 21 and the cover sheet member 22 is suppressed.

According to the present example, in the end portion of the main wire part 34, the first end portion branch wire fixing part 26A (or one of 26D, 26E, and 26F) and the second end portion branch wire fixing part 26B (or the other one of 26D, 26E, and 26F) can regulate the first end portion branch wire part 36A (or one of 36D, 36E, and 36F) and the second end portion branch wire part 36B (or die other one of 36D, 36E, and 36F) so that they separately extend.

According to the present example, the middle branch wire fixing part 26C can regulate the extension direction of the middle branch wire part 36C in the middle portion in the extension direction of the main wire part 34.

Modification Example

The embodiment described above describes the example that the branch wire fixing part 26 follows the extension direction of the main wire fixing part 24 or is perpendicular thereto. The branch wire fixing part 26 may extend in a direction oblique to the main wire fixing part 24.

Figure 8:
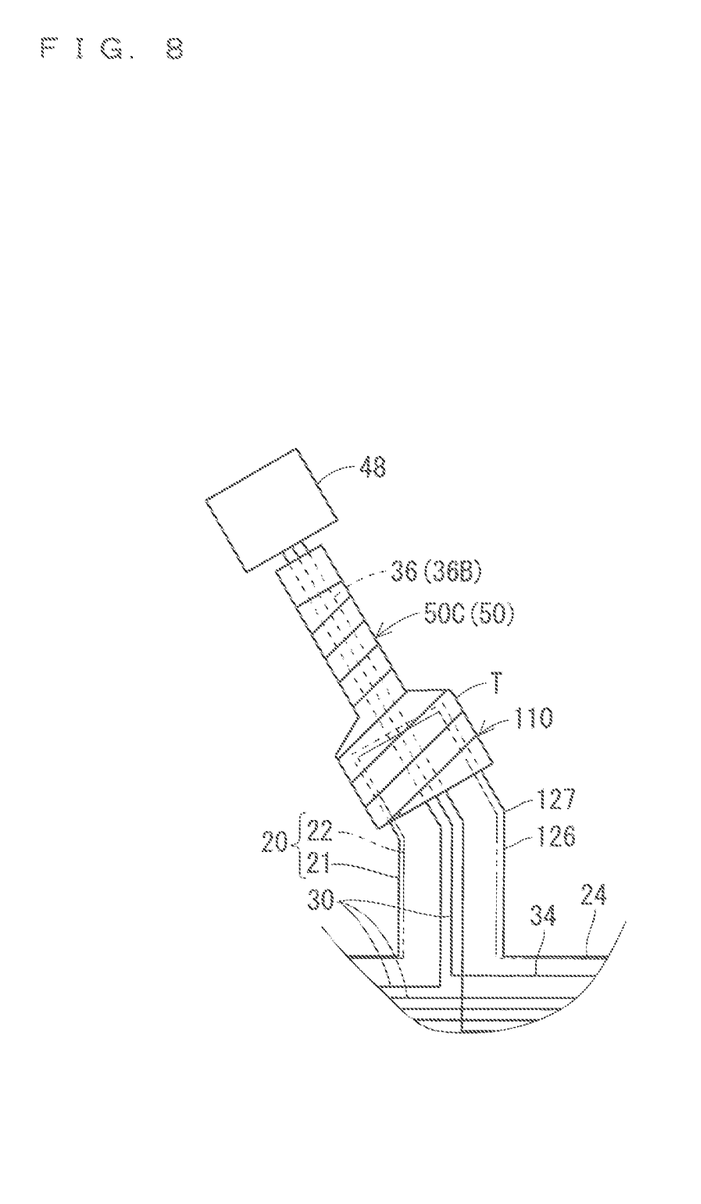
FIG. 8 is a plan view illustrating a branch wire fixing part including a bending part.

The branch wire part 36 may be preferably disposed along a curved route in some cases. In such a case, as illustrated in FIG. 8, a branch wire fixing part 126 to which the branch wire part 36 is fixed may include a bending part 127. The bending part 127 is provided in a middle portion in an extension direction of the branch wire fixing part 126. Both end portions of the branch wire fixing part 126 extend in different directions at both sides of the bending part 127. The branch wire part 36 is fixed in a bending state along the branch wire fixing part 126.

In this case, the branch wire part 36 is kept to fellow a desired curved route by the branch wire fixing part 126. Thus, the branch wire part 36 can be easily disposed in a vehicle, for example, along a curved route. A plurality of curved parts may be provided for the branch wire fixing part. The curved part may be curved with a corner or a curved line.

When a route along which the branch wire part 36 is to be disposed includes the plurality of curved parts, the branch wire fixing pan preferably includes all the curved parts and extends closer to a tip end side than the curved part located closest to the tip end side. Accordingly, the branch wire part 36 is kept in a predetermined bending state in all the bending parts.

All of the branch wire pans 36 need not include the end portion protection pan 50. It is also applicable that the wiring member may include a part where the branch wire fixing pail extends close to the connector and the protection part is omitted.

The cover sheet member 22 may be omitted. A part of the cover sheet member 22 corresponding to the branch wire fixing part 26 may be omitted. It is also applicable that a part of the base sheet member 21 corresponding to the branch wire fixing part 26 is omitted and the base end portion of the branch wire part 36 is fixed to a part of the cover sheet member 22 corresponding to the branch wire fixing pan 26.

Figure 9:
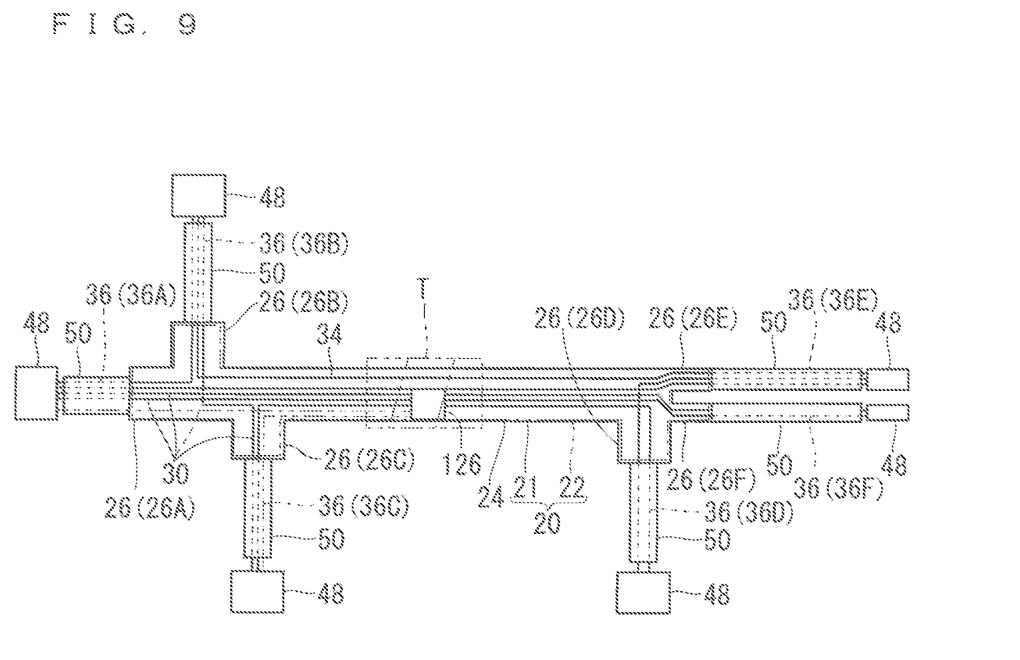
FIG. 9 is a plan view illustrating a wiring member provided with a joint connector.

The plurality of wire-like transmission members 30 as electrical wires are electrically connected in the middle portion in the extension direction of the wiring member in some cases. In such a case, as illustrated in FIG. 9, the plurality of wire-like transmission members 30 may be electrically connected via a joint connector 120. The joint connector 120 has a configuration that a conductive member electrically connecting terminals connected to each other is housed in a housing formed of resin, for example. When the terminal provided on the end portion of the wire-like transmission member 30 is inserted into the joint connector 120, the wire-like transmission member 30 is electrically connected via the conductive member. The joint connector 120 may he disposed in a stacked form on the main wire part 34 in the wiring member 10 to be fixed to the main wire part 34, for example. This fixation may also be performed by winding the adhesive tune T around the main wire part 34 and the joint connector 120, for example. Assumed is a case where resistance welding is performed on electrical wires to connect them, and a connection part thereof is housed between the base sheet member and the cover sheet member. In this case, a bulge may occur in the base sheet member or the cover sheet member due to the connection part. It is difficult to manage a position of the Bulge between the base sheet member and the cover sheet member. In the present example, the joint connector 120 overlaps with the main wire part 34, and the adhesive tape T is wound around them. Thus, a position of the joint connector 120 is easily managed. Such a configuration also has an advantage in cost reduction.

Each configuration described in the embodiment and each modification example can be appropriately combined as long as they are not contradictory.

EXPLANATION OF REFERENCE SIGNS 10 wiring member
20 base member 21 base sheet member
22 cover sheet member
74 main wire fixing part
26 branch wire fixing part
26A first end portion branch wire fixing part
26B second end portion branch wire fixing part
26C middle branch wire fixing part
26D branch wire fixing part
26E branch wire fixing part
26F branch wire fixing part
30 wire-like transmission member
34 main wire part
36 branch wire part
36A first end portion branch wire part
36B second end portion branch wire part
36D middle branch wire part
36E, branch wire part
36F branch wire part
48 connector
50 end portion protection part
50A end portion protection part
50B end portion protection part
50C end portion protection part
110 winding fixing part
120 joint connector
126 branch wire fixing part
127 bending part
C corrugate tube
Ca large diameter part
Cb small diameter part
T adhesive tape

The invention claimed is:

1. A wiring member, comprising:
a base member; and
a plurality of wire-like transmission members fixed to the base member, wherein
the plurality of wire-like transmission members are fixed to the base member along a route in which a branch wire part branches from a main wire part,
the base member includes a main wire fixing part to which the main wire part is fixed and a branch wire fixing part to which a base end part in the branch wire part is fixed, and
the branch wire part extends to a further outer side from a tip end portion of the branch wire fixing part,
the wiring member further comprising an end portion protection part covering a part of the branch wire part extending from the tip end portion of the branch wire fixing part, wherein,
at an interface where the branch wire part extends from the branch wire fixing part and into the end portion protection part, a shape of a cross-section of the branch wire fixing part is polygonal and a shape of a cross-section of the end portion protection part at the interface is circular, and wherein
opposing flat surfaces of the branch wire fixing part contact outer surfaces of the plurality of wire-like transmission members at the interface where the plurality of wire-like transmission members extend along the branch wire fixing part.

2. The wiring member according to claim 1, wherein the base member includes a sheet member.

3. The wiring member according to claim 1, wherein the end portion protection part is made up of an adhesive tape wound around a part of the branch wire part extending from a tip end portion of the branch wire fixing part.

4. The wiring member according to claim 3, further comprising
a winding fixing part made up of an adhesive tape wound around a base end portion of the branch wire part and the branch wire fixing part, wherein
the adhesive tape constituting the end portion protection part and the adhesive tape constituting the winding fixing part are continuously formed.

5. The wiring member according to claim 4, wherein
a length of the branch wire fixing part is equal to or larger than a width of the adhesive tape constituting the winding fixing part.

6. The wiring member according to claim 1, wherein the end portion protection part is a corrugate tube externally mounted to a part of the branch wire part extending from a tip end portion of the branch wire fixing part.

7. The wiring member according to claim 1, further comprising
a winding fixing part made up of an adhesive tape wound around a base end portion of the branch wire part and the branch wire fixing part.

8. The wiring member according to claim 7, wherein
a length of the branch wire fixing part is equal to or larger than a width of the adhesive tape constituting the winding fixing part.

9. The wiring member according to claim 1, wherein
the branch wire fixing part includes a bending part, and
a base end portion of the branch wire part is fixed to the branch wire fixing part in a state of being bended in the bending part.

10. The wiring member according to claim 1, wherein
the base member includes a base sheet member to which the main wire part is fixed and a cover sheet member covering the main wire part on the main wire fixing part, and
the base end portion of the branch wire part is disposed between the base sheet member and the cover sheet member in the branch wire fixing part.

11. The wiring member according to claim 10, wherein a rigidity of the cover sheet member is higher than a rigidity of the base sheet member.

12. The wiring member according to claim 1, wherein
the plurality of wire-like transmission members branch into a first end portion branch wire part and a second end portion branch wire part as the branch wire part at an end portion of the main wire part,
the base member branches into a first end portion branch wire fixing part and a second end portion branch wire fixing part as the branch wire fixing part at an end portion of the main wire fixing part, and
a base end part of the first end portion branch wire part is fixed to the first end portion branch wire fixing part, and a base end part of the second end portion branch wire part is fixed to the second end portion branch wire fixing part.

13. The wiring member according to claim 1, wherein
the plurality of wire-like transmission members branch into a middle branch wire part as the branch wire part in a middle portion in an extension direction of the main wire part,
the base member branches into a middle branch wire fixing part as the branch wire fixing part in a middle portion in an extension direction of the main wire fixing part, and
a base end part of the middle branch wire part is fixed to the middle branch wire fixing part.

14. The wiring member according to claim 1, wherein, at the interface,
the cross-section of the end portion protection part is closer to being circular in shape than the cross-section of the branch wire part.

15. The wiring member according to claim 1, wherein each of the plurality of wire-like transmission members is fixed to the base member by melting resin included in at least one of the wire-like transmission member and the base member.

16. The wiring member according to claim 1, wherein the branch wire part includes a first branch wire part and a second branch wire part that is opposed to the first branch wire part, and the branch wire fixing part includes a first branch wire fixing part to which the first branch wire is fixed and a second branch wire fixing part to which the second branch wire is fixed.

* * * * *